US006001256A

United States Patent [19]
Hawthorne et al.

[11] Patent Number: 6,001,256
[45] Date of Patent: Dec. 14, 1999

[54] METHOD OF MANIPULATING THE CHEMICAL PROPERTIES OF WATER TO IMPROVE THE EFFECTIVENESS OF A DESIRED CHEMICAL PROCESS

[75] Inventors: Steven B. Hawthorne; David J. Miller, both of Grand Forks, N. Dak.; Yu Yang, Greenville, N.C.; Arnaud Jean-Marie Lagadec, Grand Forks, N. Dak.

[73] Assignee: Energy & Environmental Research Center, Grand Forks, N. Dak.

[21] Appl. No.: 08/936,183

[22] Filed: Sep. 24, 1997

Related U.S. Application Data

[60] Provisional application No. 60/026,479, Sep. 25, 1996.

[51] Int. Cl.$^6$ .......................... B01D 11/00; B01D 11/02; B01D 11/04

[52] U.S. Cl. ..................... 210/643; 210/633; 210/634; 210/635; 210/690; 210/694; 210/737; 210/774

[58] Field of Search .................................. 210/633, 634, 210/635, 643, 690, 694, 737, 774

[56] References Cited

U.S. PATENT DOCUMENTS

| | | | |
|---|---|---|---|
| 4,438,816 | 3/1984 | Urban et al. | 166/303 |
| 4,968,787 | 11/1990 | Inada et al. | 536/18.5 |
| 5,449,820 | 9/1995 | Fukui et al. | 562/486 |

OTHER PUBLICATIONS

Haar, L.; Gallagher, J.S.; Kell, G.S., National Bureau of Standards/National Research Council Steam Tables; Hemisphere Publishing Corp.: Bristol, Prior Art, 1984, pp. 16–22, 263, 266 and 267.

Melander, W.R.; Horvath, C., High Performance Liquid Chromatography—Advances and Perspectives; vol. 2, Horvath, C., Ed., Academic Press, Inc.: New York, 1980, pp. 113–319.

David J. Miller & Steven B. Hawthorne; *Analytical Chemistry*: Subcritical Water Chromatography with Flame Ionization Detection; Feb. 15, 1997, Reprinted from vol. 69, No. 4; p. 623–627.

Steven B. Hawthorne, Yu Yang & David J. Miller; *Analytical Chemistry*: Extraction of Organic Pollutants from Environmental Solids with Sub– and supercritical Water; Sep. 15, 1994; vol. 66, No. 18; p. 2912–2920.

Yu Yang, Soren Bowadt, Steven B. Hawthorne, & David J. Miller; *Analytical Chemistry*: Subcritical Water Extraction of Polychlorinated Biphenyls from Soil and Sediment; Dec. 15, 1995; vol. 67, No. 24; p. 4571–4576.

Kimberly J. Hageman, Laurent Mazeas, Carol B. Grabanski, David J. Miller, and Steven B. Hawthorne; *Analytical Chemistry*: Coupled Subcritical Water Extraction with Solid–Phase Microextraction for Determining Semivolatile Organics in Environmental Solids; Nov. 15, 1996; Reprinted from vol. 68, No. 22, p. 3892–3898.

Yu Yang, Steven B. Hawthorne, and David J. Miller; *Environmental Science & Technology*: Class–Selection Extraction of Polar, Moderately Polar, and Nonpolar Organics from Hydrocarbon Wastes Using Subcritical Water; 1997, Reprinted from vol. 31, No. 2; p. 430–437.

*Primary Examiner*—John Kim
*Attorney, Agent, or Firm*—Zarley, McKee, Thomte, Voorhees & Sease

[57] ABSTRACT

The method of the present invention is adapted to manipulate the chemical properties of water in order to improve the effectiveness of a desired chemical process. The method involves heating the water in the vessel to subcritical temperatures between 100° to 374° C. while maintaining sufficient pressure to the water to maintain the water in the liquid state. Various physiochemical properties of the water can be manipulated including polarity, solute solubility, surface tension, viscosity, and the disassociation constant. The method of the present invention has various uses including extracting organics from solids and semisolids such as soil, selectively extracting desired organics from nonaqueous liquids, selectively separating organics using sorbent phases, enhancing reactions by controlling the disassociation constant of water, cleaning waste water, and removing organics from water using activated carbon or other suitable sorbents.

23 Claims, 23 Drawing Sheets

| Pesticide | Concentration Before Cleanup, mg/kg | % of Pesticide Degraded | |
|---|---|---|---|
| | | 200°C, 30 min | 250°C, 30 min |
| Alachlor | 210 | 92 | >98 |
| Atrazine | 190 | 75 | >98 |
| Cyanazine | 110 | 97 | >98 |
| Metolachlor | 120 | 97 | >98 |
| Pendimethalin | 460 | >98 | >98 |
| Trifluralin | 110 | 96 | >98 |

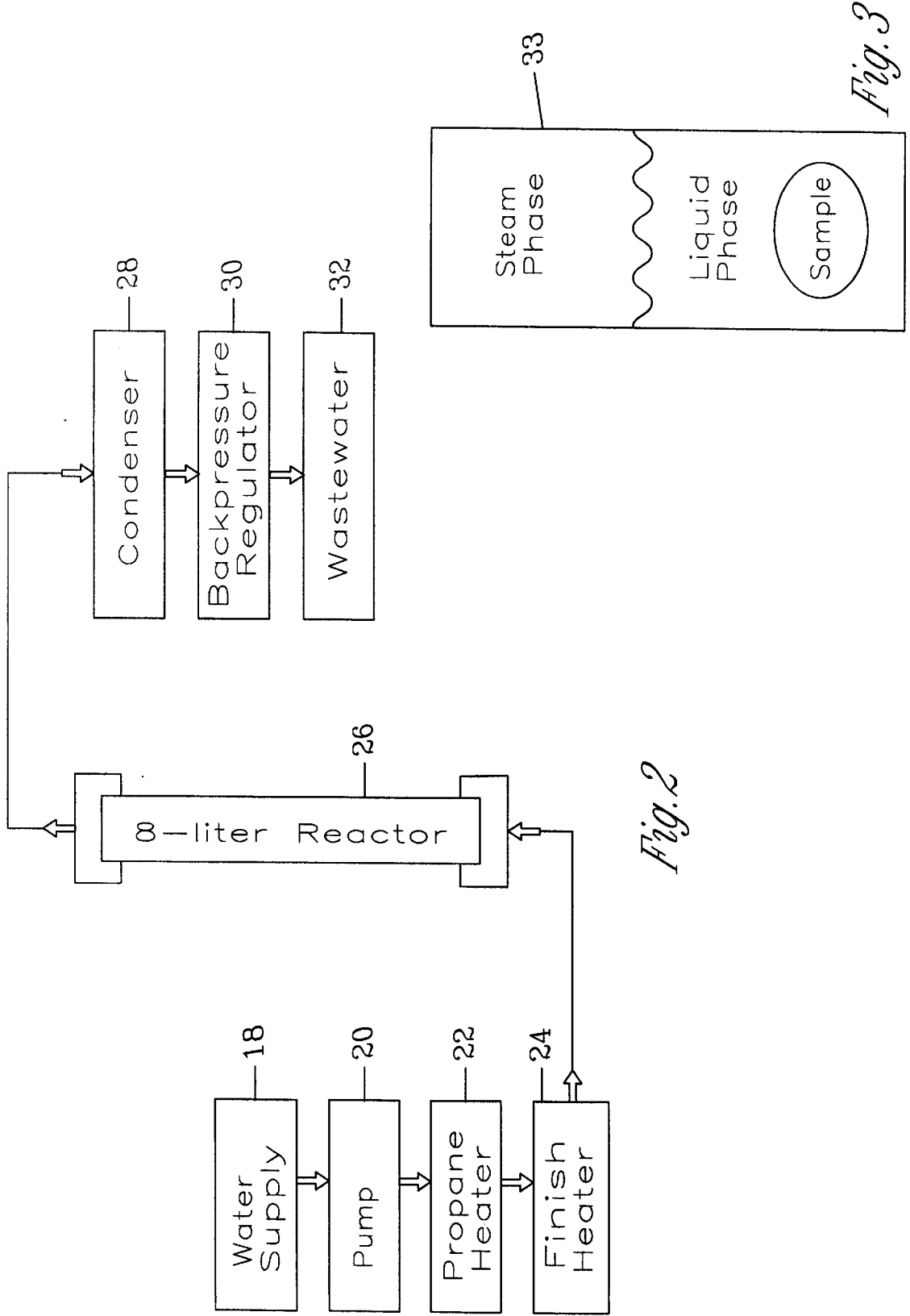

|  | Concentration[a] [μg/g] ± SD | Cumulative Percent Removal[b] Liquid Water | | |
|---|---|---|---|---|
|  |  | 150°C | 200°C | 250°C |
| Phenol | 1313 ± 146 | 99 | 100 | 100 |
| o-Cresol | 1016 ± 132 | 97 | 100 | 100 |
| m, p-Cresol | 2358 ± 256 | 98 | 100 | 100 |
| $C_2$-Alkylphenol | 748 ± 91 | 93 | 97 | 100 |
| Naphthalene | 1007 ± 20 | 95 | 99 | 100 |
| Phenanthrene | 20 ± 1.3 | 25 | 75 | 97 |
| Pyrene | 0.81 ± 0.025 | 5 | 46 | 93 |
| $C_{11}$ | 669 ± 91 | 2 | 6 | 58 |
| $C_{12}$ | 704 ± 92 | [c] | 3 | 38 |
| $C_{13}$ | 766 ± 79 | — | 2 | 36 |
| $C_{14}$ | 684 ± 75 | — | — | 23 |
| $C_{15}$ | 603 ± 64 | — | — | 18 |
| $C_{16}$ | 381 ± 65 | — | — | 13 |
| $C_{17}$ | 332 ± 52 | — | — | 14 |
| $C_{18}$ | 127 ± 16 | — | — | 9 |
| $C_{19}$ | 70 ± 7.9 | — | — | 9 |
| $C_{20}$ | 41 ± 5.7 | — | — | 8 |
| $C_{21}$ | 23 ± 5.3 | — | — | 7 |
| $C_{22}$ | 16 ± 0.85 | — | — | — |
| $C_{23}$ | 17 ± 1.8 | — | — | — |
| $C_{24}$ | 25 ± 3.2 | — | — | — |
| $C_{25}$ | 41 ± 5.0 | — | — | — |
| $C_{26}$ | 54 ± 6.4 | — | — | — |
| $C_{27}$ | 58 ± 6.5 | — | — | — |
| $C_{28}$ | 52 ± 5.4 | — | — | — |
| $C_{29}$ | 47 ± 4.6 | — | — | — |
| $C_{30}$ | 34 ± 2.9 | — | — | — |
| $C_{31}$ | 25 ± 1.9 | — | — | — |
| $C_{32}$ | 15 ± 0.93 | — | — | — |
| $C_{33}$ | 9.0 ± 0.54 | — | — | — |

[a] Values were obtained by 16-hour sonication extractions of triplicate fresh samples using methylene chloride and acetone.

[b] 100% removal is defined by the lack of any detectable species in the 16-hour sonication extract of the residues after 60-minute water extraction.

[c] Not detected in this fraction.

Fig. 6

| Pesticide | Approximate Concentration, mg/kg | |
|---|---|---|
| | Before Cleanup | After Cleanup |
| Alachlor | 210 | ND[a] |
| Atrazine | 190 | ND |
| Cyanazine | 110 | ND |
| EPTC | 530 | ND |
| Metolachlor | 120 | ND |
| Pendimethalin | 460 | ND |
| Trifluralin | 110 | ND |

[a] Not detected. Estimated detection limits correspond to >99.9% removal.

Fig. 7

| Pesticide | Approximate Concentration Before Cleanup, mg/kg | % of Pesticides Removed in 15 min | |
|---|---|---|---|
| | | 150°C | 200°C |
| Alachlor | 210 | 96 | 99 |
| Atrazine | 190 | >99[a] | >99 |
| Cyanazine | 110 | >99 | >99 |
| EPTC | 530 | >99 | >99 |
| Metolachlor | 120 | >99 | >99 |
| Pendimethalin | 460 | 96 | >99 |
| Trifluralin | 110 | 80 | >99 |

[a] Compounds listed as >99% removed were not detected in the soil after water extraction. Estimated detection limits correspond to >99% removal.

Fig. 8

|                              | Soil A | Soil B | Soil C |
|------------------------------|--------|--------|--------|
| Initial Concentration, mg/kg | 213    | 3380   | 50     |
| Mercury Removed:             |        |        |        |
| 15 min., 250°C               | 71%    | 35%    | 87%    |
| 30 min., 250°C               | 95%    | 45%    | —      |
| 30 min., 300°C               | —      | 84%    | 93%    |

Fig. 9

| Pesticide | Concentration Before Cleanup, mg/kg | % of Pesticide Degraded | |
|---|---|---|---|
| | | 200°C, 30 min | 250°C, 30 min |
| Alachlor | 210 | 92 | >98 |
| Atrazine | 190 | 75 | >98 |
| Cyanazine | 110 | 97 | >98 |
| Metolachlor | 120 | 97 | >98 |
| Pendimethalin | 460 | >98 | >98 |
| Trifluralin | 110 | 96 | |

Fig. 13

|  | Label Value vol% | Measured Value vol% ± SD[a] |
|---|---|---|
| Whiskey | 50 | 49 ± 0.5 |
| Rum | 40 | 41 ± 1 |
| Red Wine | 13 | 13 ± 0.5 |
| Beer | 5.6 | 5.5 ± 0.1 |

[a] RSDs were based on triplicate determinations of each beverage.

*Fig. 17*

METHOD OF MANIPULATING THE CHEMICAL PROPERTIES OF WATER TO IMPROVE THE EFFECTIVENESS OF A DESIRED CHEMICAL PROCESS

CROSS REFERENCE TO RELATED APPLICATION

This application claims priority under 35 U.S.C. §119(e) based upon U.S. provisional application Ser. No. 60/026,479 filed Sep. 25, 1996, entitled PROCESS FOR THE SEPARATION OF ORGANIC COMPOUNDS FROM AND ON SOLIDS AND SEMISOLIDS BASED ON CHANGES IN VISCOSITY, SURFACE TENSION, AND DIELECTRIC PROPERTIES OF WATER.

The invention was developed with government support under U.S. Department of Energy Contract No. DE-FC21-93MC30097.

BACKGROUND OF THE INVENTION

1. Field of the Invention

The present invention relates to manipulating the physiochemical properties of water. More particularly, though not exclusively, the present invention relates to a method for using subcritical water to improve the effectiveness of a desired chemical process.

2. Problems in the Art

Throughout the world there is a large need to clean contaminated materials. For example, it is often desired to extract organics as well as nonorganics and metals from solids and semi-solids. Examples include the removal of PAHs, PCBs, pesticides, and metals from soil. Contaminated soil may result from various things including agricultural chemicals, industrial pollution, chemical waste, etc. It is typically difficult and very expensive to remove these contaminants from the contaminated soil. Another example involves the extraction of mercury from contaminated soils. One prior art method of removing contaminants from solids or semisolids involves the use of organic solvents to dissolve the contaminants.

Many industrial processes use organic solvents for separations, reactions, and applications such as applying coatings. Such processes often result in emissions of the solvents and the associated emission control costs.

Another large problem involves the clean up of water. Polluted water or waste water often contains organic or non organic materials which must be removed to clean the water. One common prior art method of removing organics from water involves the use of activated carbon or other suitable sorbents. In an activated carbon filter, water is passed through the filter where the carbon collects the material to be removed from the water. It is well accepted that an activated carbon filter is less effective as the solubility in water of the material to be extracted increases. In other words, the effectiveness of an activated carbon filter is inversely proportional to the solubility of the contaminant in water.

The following references describe background material in detail and are incorporated by reference herein:

Hawthorne, S. B.; Yang, Y.; Miller, D. J., *Analytical Chemistry*, 1994, 66, 2912.

Yang, Y.; Bowadt, S.; Hawthorne, S. B.; Miller, D. J., *Analytical Chemistry*, 1995, 67, 4571.

Haar, L.; Gallagher, J. S.; Kell, G. S., *National Bureau of Standards/National Research Council Steam Tables*; Hemisphere Publishing Corp.: Bristol, PRIOR ART, 1984.

Melander, W. R.; Horvath, C., *High Performance Liquid Chromatography—Advances and Perspectives*; Vol. 2, Horvath, C., Ed.; Academic Press, Inc.: New York, 1980, pp 113–319.

Features Of The Invention

A general feature of the present invention is the provision of a method for manipulating the physiochemical properties of water which overcomes problems found in the prior art.

A further feature of the present invention is the provision of a method of manipulating the physiochemical properties of water to improve the effectiveness of a desired chemical process by using subcritical water.

Further features, objects, and advantages of the present invention include:

A method for manipulating physiochemical properties of water by subjecting the water to temperatures within the range of 100° to 374° C. while maintaining sufficient pressure to the water to maintain the water in the liquid state (these conditions are defined herein as subcritical water).

A method for extracting organics from solids and semisolids using subcritical water.

A method for selectively extracting desired organics from nonaqueous liquids using subcritical water.

A method for selectively separating different organics using sorbent phases in subcritical water.

A method for enhancing reactions by controlling the disassociation constant of water.

A method for controlling the polarity of water.

A method for controlling the solubility of organic compounds and metals in water.

A method for controlling the viscosity of water.

A method for controlling the surface tension of water.

A method for removing organics from water based on lowered solubility upon cooling the water.

A method for removing organics from water using activated carbon under subcritical water conditions.

These, as well as features, objects and advantages of the present invention will become apparent from the following specification and claims.

SUMMARY OF THE INVENTION

The method of the present invention is used to manipulate the physiochemical properties of water in order to improve the effectiveness of a desired chemical process. The method involves heating water to temperatures in the range of 100° to 374° C. while maintaining sufficient pressure to the water to maintain the water in the liquid state. The water may be maintained in a liquid state by either applying pressure or utilizing the steam/water equilibrium. The physiochemical properties manipulated by the method may include: the polarity of water, the surface tension of the water, the viscosity of the water, the solubility of solutes in the water, and the disassociation constant of the water.

BRIEF DESCRIPTION OF THE DRAWINGS

FIG. 2 is a block diagram of a subcritical water remediation unit.

FIG. 3 is a block diagram of a subcritical water device using steam/liquid equilibrium.

FIG. 6 is a table illustrating the effect of water on selective extractions of organics from petroleum waste sludge.

FIG. 7 is a table illustrating the removal of pesticides from contaminated soil using subcritical water at 250° C.

FIG. 8 is a table illustrating the removal of pesticides from contaminated soil using subcritical water at temperatures lower than 250° C.

FIG. 9 is a table illustrating the removal of mercury from contaminated soil using subcritical water.

FIG. 13 is a table showing the degradation of pesticides in contaminated soil using subcritical water.

FIG. 17 is a table showing the determination of ethanol concentration in alcoholic beverages by reverse-phase high-pressure liquid chromatographic (HPLC) with water as a mobile phase and FID dectection.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

When water is heated beyond 100° C. (the boiling point of water at atmospheric presssure), but is kept under sufficient pressure to maintain a liquid state, the water becomes "subcritical water" or hot/liquid water. This state of water continues as the water is heated up to 374° C. At higher temperatures, the water becomes supercritical and is not the subject of this invention. For the purposes of this description, the temperature range of subcritical water will be defined as being between the normal boiling point and the critical temperature of water (e.g., approximately 100° to 374° C). The method of the present invention exploits the attractive properties of subcritical water under moderate pressures to, among other things, increase the solubilities of organic compounds by lowering the polarity of water and to enhance mass transfer of organic compounds from solids by lowering the water's viscosity and surface tension (described below). Only pure water is used, without the need for additives, to achieve solubility changes as great as ca. 1 million-fold.

Figure 1:
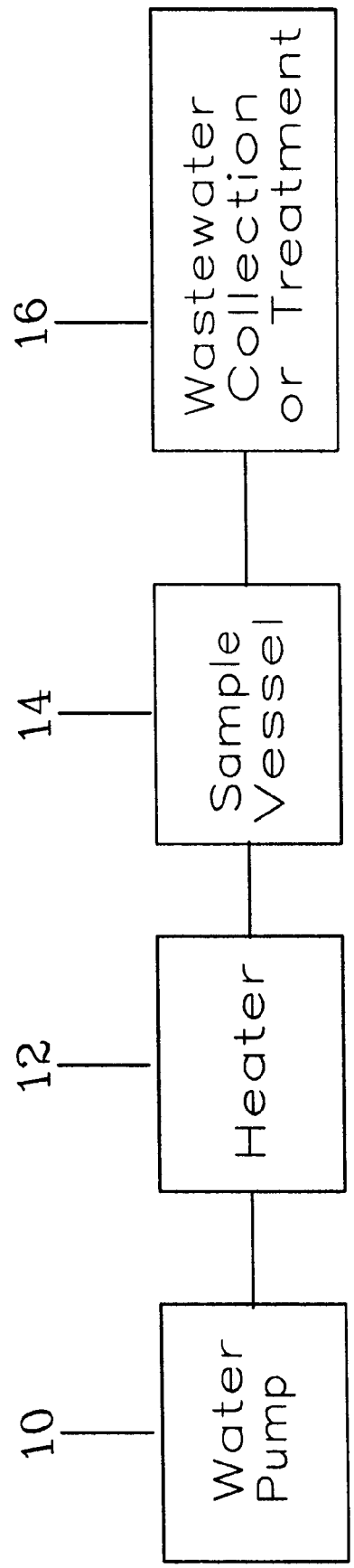
FIG. 1 is a block diagram of a subcritical water extraction unit.

FIG. 1 is a block diagram showing one possible subcritical water extraction unit. FIG. 1 shows a water pump 10, a heater 12, a sample vessel 14, and a wastewater collection or treatment device 16. Water is pressurized by the pump 10, heated by the heater 12, and is pumped into the sample vessel 14. The water is heated to a temperature in the range of 100° to 374° C. under pressure sufficient to maintain the water in a liquid state. The pressure is provided either by the pump 10 or by steam/water equilibrium (discussed below). When the steam/water equilibrium is utilized an important safety note is to ensure that a sufficient headspace volume is available in the vessel to allow for the existence of the steam phase in order to avoid generating substantial pressure which could rupture the vessel causing damage or injury.

FIG. 2 is a more detailed block diagram of a subcritical water remediation unit. FIG. 2 shows a water supply 18, a pump 20, a propane-fired water heater 22, and a finish heater 24 connected to a heated vessel 26 (in this example, an 8 liter reactor). The vessel 26 is also connected to a condenser 28, a backpressure regulator 30, and a wastewater collection or treatment device 32. Heated water (100° to 374° C.) is pumped into the vessel 26 under sufficient pressure to maintain the liquid state. Again, the pressure is applied by the pump 20. An alternate system using the steam/water equilibrium to maintain a portion of the water in the liquid state is shown in FIG. 3. FIG. 3 is a block diagram of a heated closed vessel 33 used to generate subcritical water using steam/liquid equilibrium. As shown, the vessel 33 contains water in both a liquid phase and a steam phase. In this configuration, the vessel could be heated directly.

Various applications which use subcritical water have been verified experimentally. These applications (described in more detail below) include: (1) the remediation of soils, sediments, and sludges that are contaminated with organic or metallic pollutants, and may include a process where the extractant water can be cleaned for recycling without the need for cooling; (2) preparative extraction of biologically active chemicals from plant tissue; (3) removal of synthesis contaminants from commercial polymers and plastics; (4) high-pressure liquid chromatographic (HPLC) separations of polar and moderately polar organics on conventional packed columns without the need for organic solvents and under conditions where a universal detector (flame ionization detector) as well as conventional HPLC detectors can be used; and (5) preparative separations of organics on sorbent phases.

Subcritical water has greatly enhanced abilities to dissolve organic compounds that have low solubilities in water in ambient conditions. Liquid water below 100° C., steam, and supercritical water (water at a temperature above 374° C. and at a pressure of greater than 218 atm) have all been used in a wide variety of commercial processes. However, the use of subcritical water (water in the range of 100° to 374° C.) has received very little attention for commercial uses. Analytical-scale extractions of organic pollutants from soils, sludges, and sediments have been demonstrated that exploit the reduced polarity (evidenced by a decrease in the dielectric constant of water) which can be achieved by subcritical water (described below). The present invention further exploits the enhanced mass transfer characteristics to extend the use of subcritical water to several processes with potential commercial applications. These enhanced mass transfer characteristics are based on lower viscosity at higher temperatures (e.g., at 200° C., which is ca. $\frac{1}{10}$ of that at ambient conditions) and the lower surface tension at higher temperatures (e.g., at 250° C. which is ca. ⅓ of that at ambient conditions).

The use of water for the processes of the present invention has various practical benefits which include, but are not limited to, the following: (1) Water is environmentally benign, widely available, and very inexpensive. (2) Water is nonhazardous to workers and nonhazardous to the environment. (3) Water extraction applies to a broad range of solids and semisolids, both of a nonbiological (e.g., soil and waste sludges) and a biological nature (e.g., plant and animal tissue). Since water is used as the extraction fluid, it does not matter whether the matrix is wet or dry. In addition, residual solvent water left on the solid matrix causes no harm. For applications such as remediation, water extraction does not destroy soil productivity, unlike incineration or some solvent extraction processes. (4) Subcritical water is much less corrosive than either steam or supercritical water and requires much lower temperatures (only 100° to 374° C.) and pressures (only ambient to 218 atm) than supercritical water which requires temperatures above 374° C. and pressures above 218 atm. This greatly reduces the engineering costs and increases the safety associated with the processes. (5) Subcritical water can be used to extract nonpolar organics, polar organics, and metals, and selectively can be introduced by simply changing the extraction temperature. (6) Since radionuclides often exist as water-insoluble salts and oxides, it is possible to extract hazardous organics from mixed wastes without extracting radioactive species.

The processes of present invention utilize several physiochemical phenomena which enhance the use of subcritical water for the removal of organic pollutants from solids, semisolids, and non-aqueous liquids. Following is a description of a number of such applications.

Figure 4A:
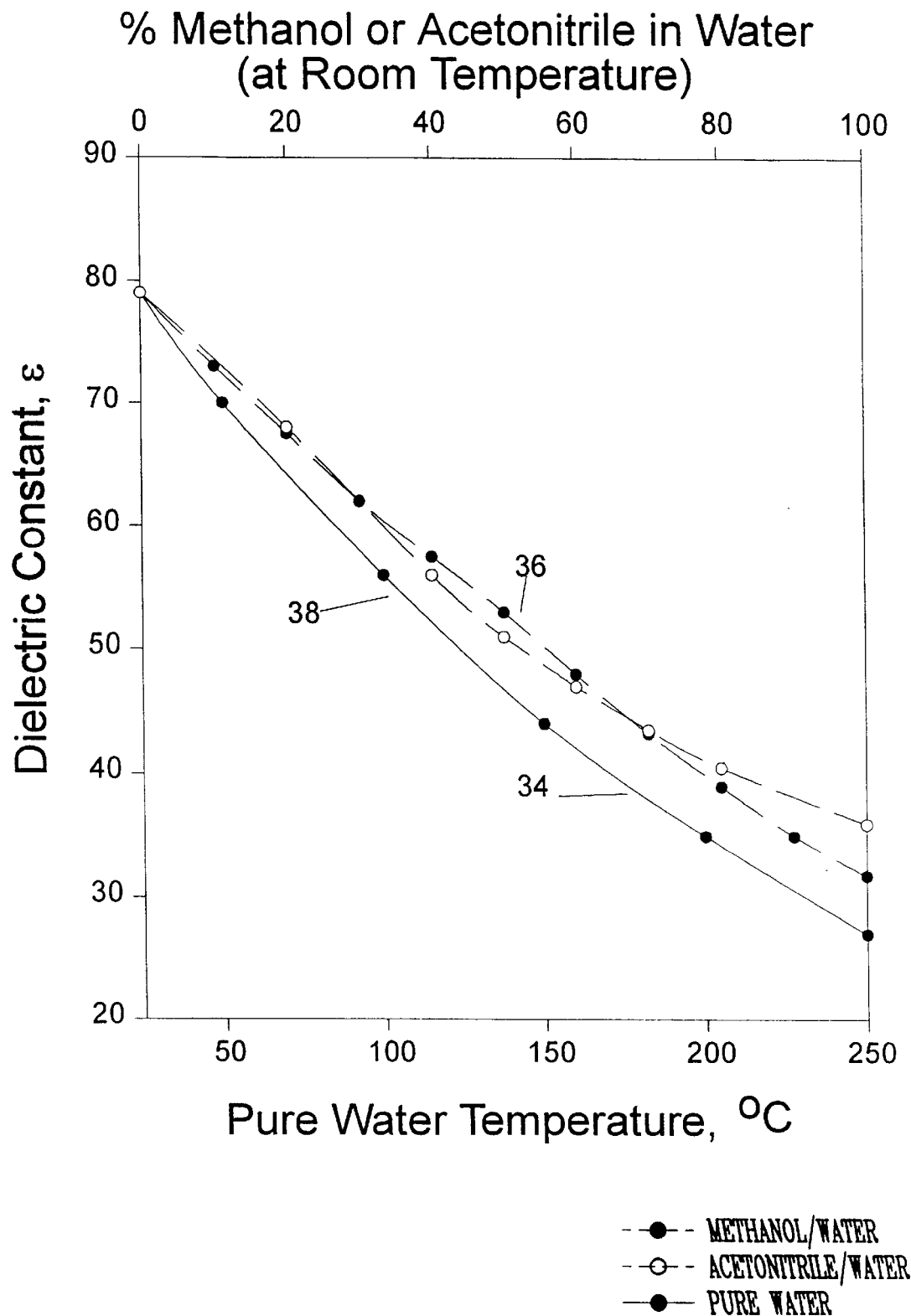
FIGS. 4A, 4B and 4C compare the dielectric constant, viscosity, and surface tension, of pure water, methanol/water mixtures, and acetonitrile/water mixtures.
Figure 4B:
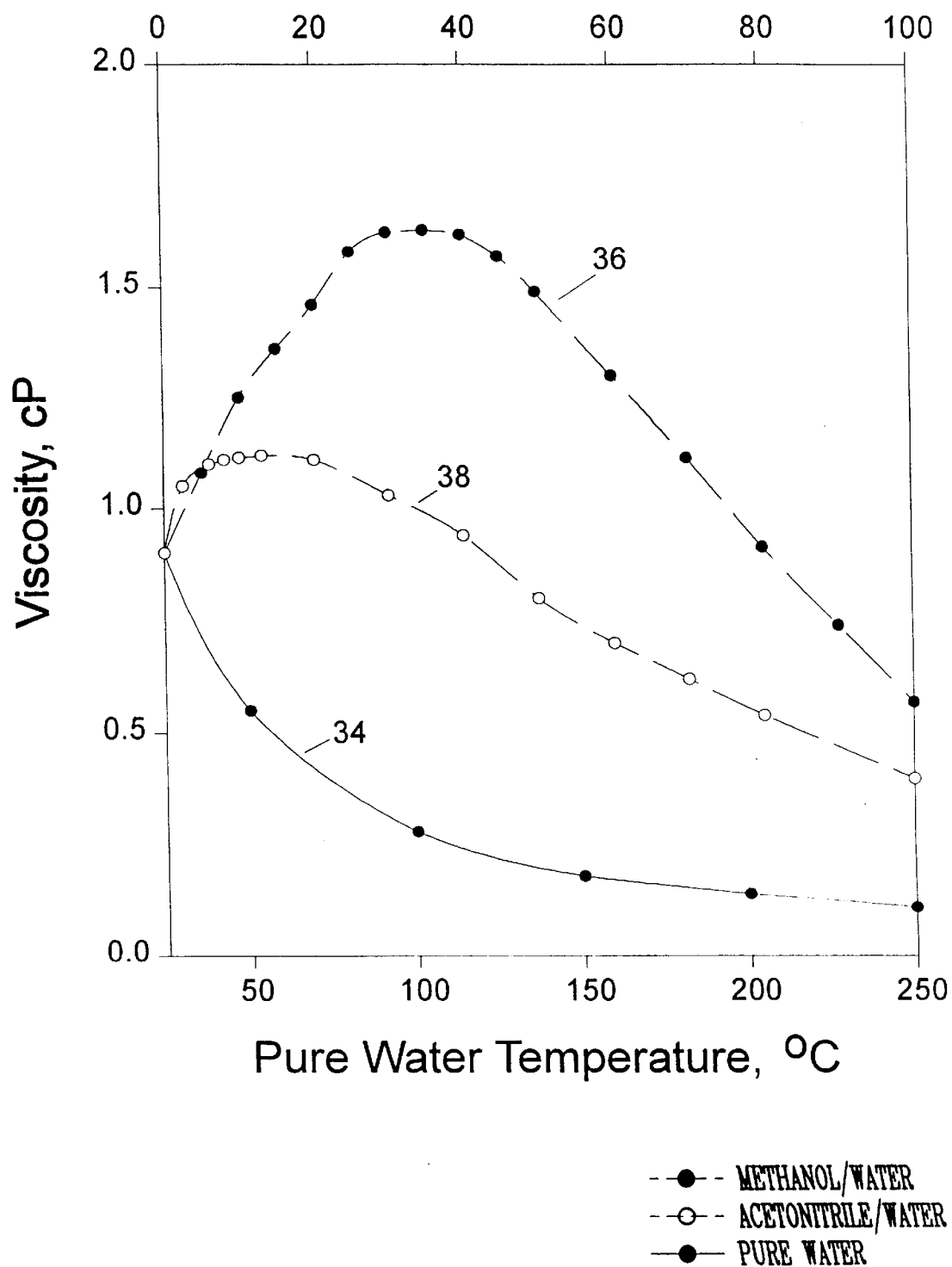
Figure 4C:
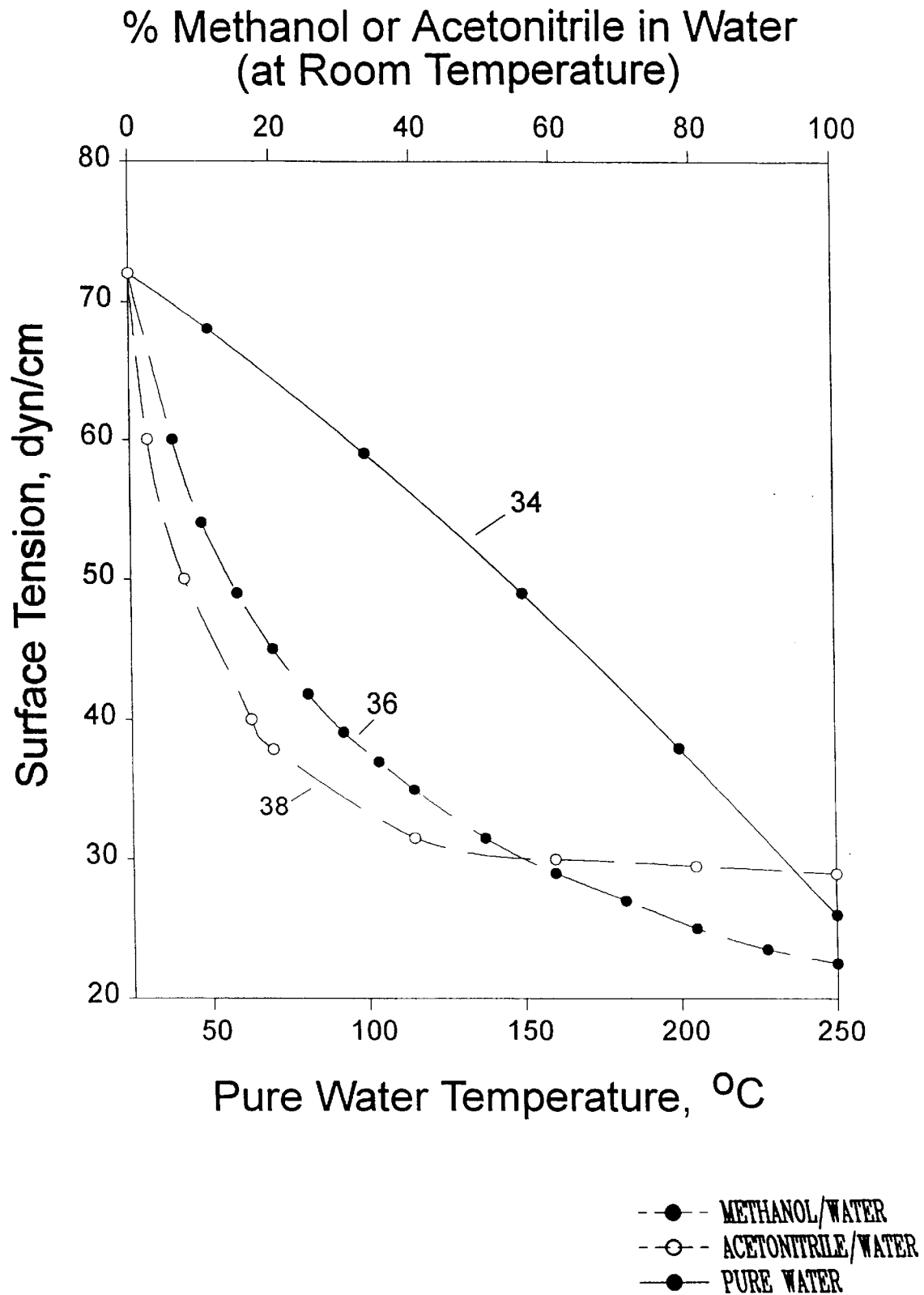

First, the polarity of water, as described by its dielectric constant, is reduced dramatically with raising temperature up to the critical temperature of water of 374° C. In order to maintain the liquid state of water, pressure is applied (e.g., between 1 and 50 atm for temperatures between 100° and 250° C.). Raising the temperature of the water makes the water behave increasingly like an organic solvent until the water's solvent properties are similar to common solvents such as methanol or acetonitrile. It has been observed that the solubility of common organic pollutants increases dramatically (ca. $10^5$-fold) in subcritical water over the solubilities of the same organics in water at ambient conditions. By controlling the water temperature in the liquid state, the solubility of organic compounds can be controlled over several orders of magnitude. FIGS. 4A, 4B, and 4C are charts which show how the polarity (dielectric constant), surface tension, and viscosity can be controlled by heating subcritical water, and compares these three parameters with the more common approach of mixing water with organic solvents at room temperature. First, FIGS. 4A–4C show the dielectric constant, viscosity, and surface tension, respectively, versus temperature for pure water 34. FIGS. 4A, 4B, and 4C also show the dielectric constant, viscosity, and surface tension, respectively, of a mixture of methanol or acetonitrile in water versus the percentage of the solvent in the mixture. As shown in FIG. 4A, the dielectric constant of pure water decreases dramatically as the temperature of the water increases. FIG. 4A also shows that the dielectric constant of the mixture of methanol/water 36 and acetonitrile/water 38 is higher than that of pure water at the temperatures and concentrations shown. As shown in FIG. 4B, the viscosity of pure water also decreases (well below the viscosity of methanol/water and acetonitrile/water at the concentrations shown) as the temperature of the water increases. As shown in FIG. 4C, the surface tension of pure water decreases dramatically as the temperature of the water increases, until it is below that of pure acetonitrile (100%) and nearly as low as pure methanol (100%).

Second, controlling the temperature of the subcritical water can be used to achieve selective removal of various classes of organics from solids, semisolids, and non-aqueous liquids (described in detail below).

Third, as shown in FIG. 4B, increasing the water temperature while maintaining enough pressure to maintain the liquid state decreases the water's viscosity (for example, by ca. 10-fold at 250° C. versus its viscosity at room temperature). This decrease in viscosity yields better mass transfer and therefore enhances extraction rates. Access to small pores in the contaminated sample and in the activated carbon used to clean the extractant water is also enhanced (described below).

Fourth, as shown in FIG. 4C, increasing the water temperature while maintaining enough pressure to maintain the liquid state, decreases the water's surface tension by ca. three-fold (at 250° C. versus room temperature). A decrease in surface tension yields better wetting of the surfaces of the contaminated samples. This results in faster extraction. Better wetting of the activated carbon used to clean the extractant water increases the rate of removal and quantities of pollutants that can be removed from the extracted water (described below). In addition, access to small pores in the contaminated sample and in the activated carbon used to clean the extracted water is also enhanced.

Unexpectedly, the effectiveness of the activated carbon increases with the use of subcritical water. Under conventional theory, an activated carbon filter should be much less effective under high temperatures since the solubility of a compound is inversely proportional the ability of the effectiveness of the carbon filter. However, the effectiveness of a carbon filter increases with the use of subcritical water—exactly opposite of what would be expected.

Finally, the pressure used for extraction has no significant effect on the removal rates and efficiencies of organic compounds from solid, semisolid, and non-aqueous liquids, as has previously been demonstrated for analytical scale extraction of organic compounds. Therefore, the process only requires enough pressure to maintain the water in the liquid state.

Following are examples of uses of the chemical phenomena described above.

Figure 5:
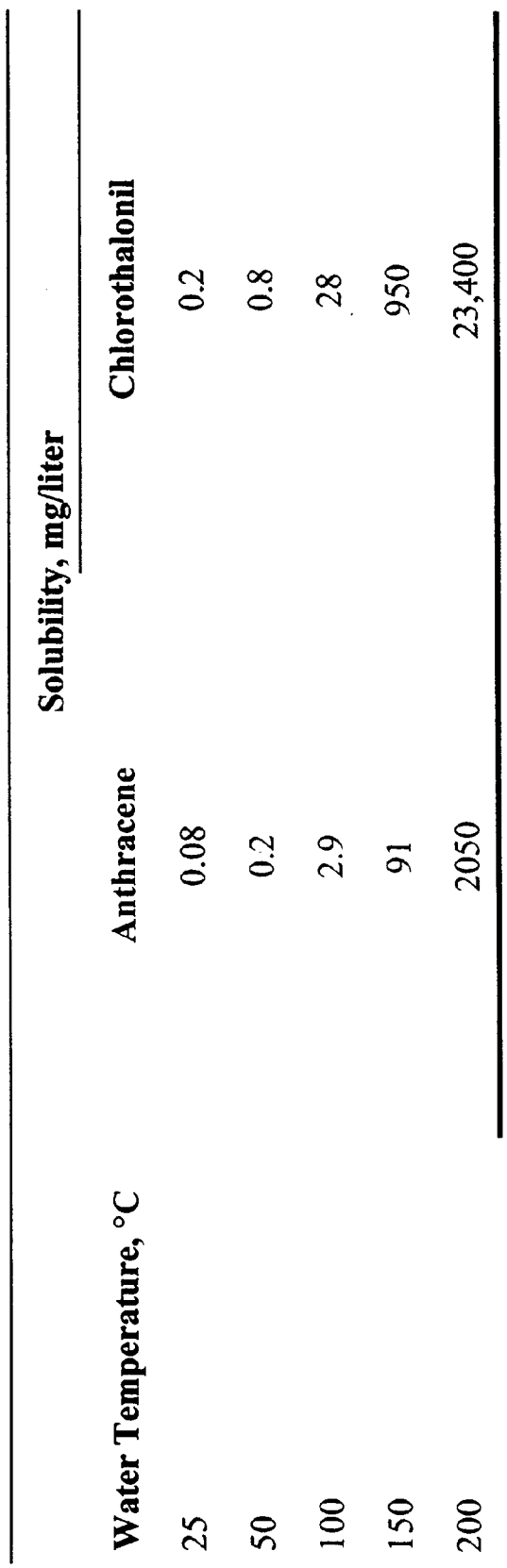
FIG. 5 is a table illustrating the temperature control of organic compound solubility in subcritical water.

In a first example, the solubility of organic compounds can be controlled by controlling the temperature of heated water (subcritical water) held in the liquid state by the application of pressure. The solubility of organic compounds can be controlled in subcritical water over several orders of magnitude. This ability, along with the enhanced mass transfer (resulting from lower viscosity and lower surface tension), provides the basis for using subcritical water for the processes described below. FIG. 5 is a table illustrating the ability to control the solubility of organic compounds. FIG. 5 shows the solubility (in mg/liter) of anthracene and chlorothalonil at various temperatures. As shown, the solubility dramatically increases as the water temperature increases. Similar abilities to control solubilities have been demonstrated for benzo[a]pyrene and the pesticides propazine and endosulfan II, for example.

In a second example, hazardous organics can be removed from waste sludges. Examples include the selective removal of phenols and PAHs (polycyclic aromatic hydrocarbons) at 150° to 250° C. Less than one percent removal of total nonhazardous organic components (e.g., alkanes and other nonhazardous sludge matrix components) yielding ca. 1:100 reduction and hazardous waste volume are possible. FIG. 6 is a table illustrating data for the effect of water temperature on selective extractions of organics from petroleum waste sludge determined by a sequential extraction at 50 atm for ten minutes at each temperature.

In a third example, the process of the present invention can be used for the removal of pesticides from contaminated soil. FIG. 7 is a table demonstrating the removal of pesticides from contaminated soil in 15 minutes with subcritical water at 250° C. FIG. 7 shows the approximate concentrations (in mg/kg) of various pesticides before and after their removal. As shown, a complete removal (greater than 99.9%) of polar and nonpolar pesticides from highly contaminated soil in 15 minutes is possible. FIG. 8 is a table illustrating the removal of the same pesticides from contaminated soil in 15 minutes with subcritical water at temperatures below 250° C. As shown, the complete removal of many pesticides and nearly complete removal of the remaining pesticides are possible at lower temperatures in the range of 150° to 200° C.

FIG. 9 is a table illustrating the removal of mercury from contaminated soil with subcritical water. FIG. 9 shows examples of three soil samples with differing initial concentrations. FIG. 9 then shows the percentage of mercury removed for various temperatures and for various amounts of extraction time.

In a fourth example, the process may be used to extract organic compounds from solids and semisolids which allows for the purification and continuous reuse of the extractant water. The process also allows for the concentration of extracted organics into a solid phase cartridge. Clean up of the contaminated (extractant) water is achieved by passing the water through activated carbon or some other sorbent material (described in detail below). For example, activated carbon can be placed in a cartridge which receives a flow of extractant water after the sample extraction in order to absorb the extracted organic compounds from the extractant water. This type of process does not require any cooling of the extractant water. This process also allows continuous recycling of the extractant water which therefore reduces the quantity of water required. This process also operates at the extractant temperature, reducing the heating requirements for the process since only the solid or semisolid sample needs to be heated after the initial heating of the extractant water. Following are examples of complete (>99.9%) removal of extracted organics from the extractant water using activated carbon placed such that the water flows through the activated carbon after extracting the sample.

First, the removal of pesticides from highly contaminated (several hundred parts per million (ppm) of individual pesticides) soil is achieved. As shown in the table of FIG. 7, the water extraction at 250° C. removes virtually all detectable pesticides from the soil. The extractant water can be cleaned simultaneously by passing the water through an activated carbon cartridge (also at 250° C.) placed directly after the soil sample. No pesticides were detected in the effluent water, indicating at least 99.9% clean up of the effluent as demonstrated in FIG. 10B.

Figure 10B:
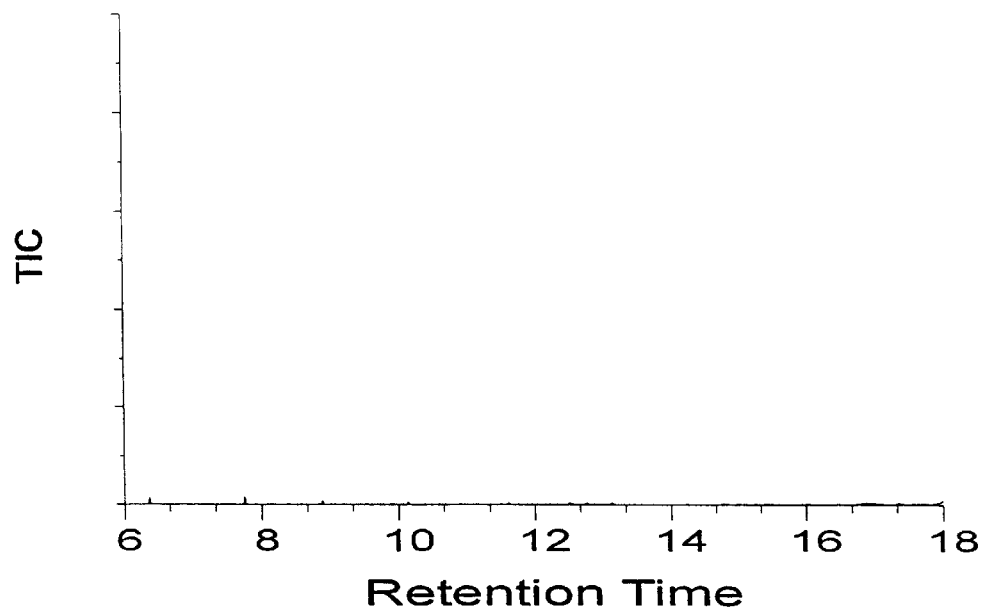
FIGS. 10A and 10B are plots of gas chromatography/mass spectrometry analyses of pesticides extracted from highly contaminated soil before (FIG. 10A) and after (FIG. 10B) treatment of the extractant water with hot activated carbon.
Figure 10A:
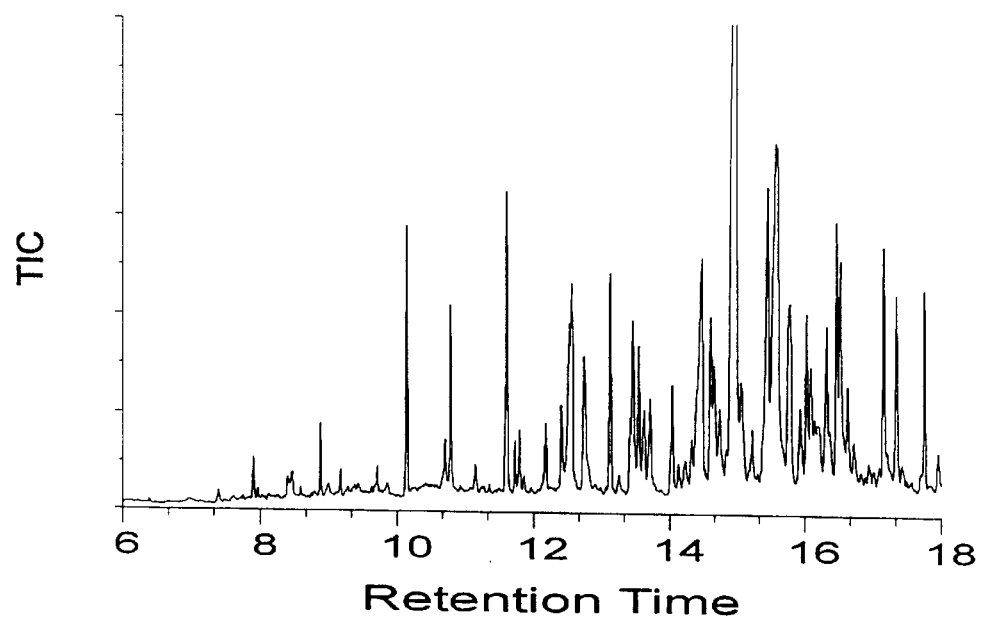

FIGS. 10A and 10B are plots of gas chromatography/mass spectrometry analyses of pesticides extracted from highly contaminated soil. The chromatogram in FIG. 10A shows the pesticides found in the extracted water when no activated carbon was used. The chromatogram in FIG. 10B shows the absence of any detectable pesticides when a duplicate sample was extracted with an activated carbon sorbent placed such that the extractant water passes through the carbon after the pesticides were extracted from the soil.

Experiments have demonstrated a volume waste reduction of more than 100 to 1 (the weight of the soil extracted compared to the weight of activated carbon used to clean the extractant water) for soil contaminated with several hundred ppm of pesticides. The actual volume of waste reduction is likely to be greater than 100 to 1 for the sample. The ability of the sorbent to clean extracted water at a ratio of at least 1000 to 1 (the weight of water to the weight of activated carbon) is also possible. Experiments demonstrate soils contaminated at lower concentrations require proportionally lower amounts of activated carbon to clean the extractant water.

Figure 11B:
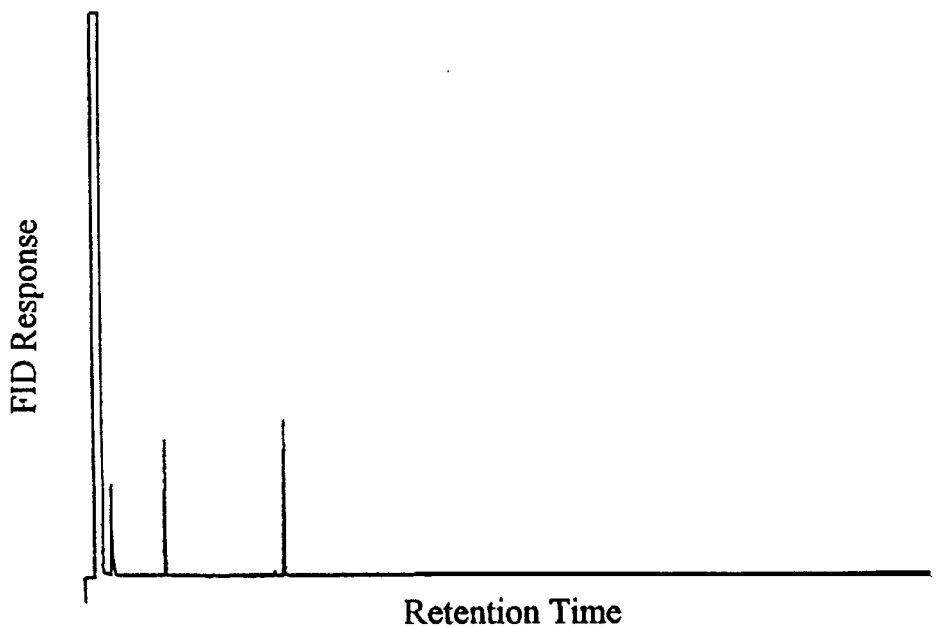
FIGS. 11A and 11B are gas chromatography/flame ionization detection (FID) analyses of coal tar PAHs extracted from highly contaminated soil before (FIG. 11A) and after (FIG. 11B) treatment of the extractant water with hot activated carbon.
Figure 11A:
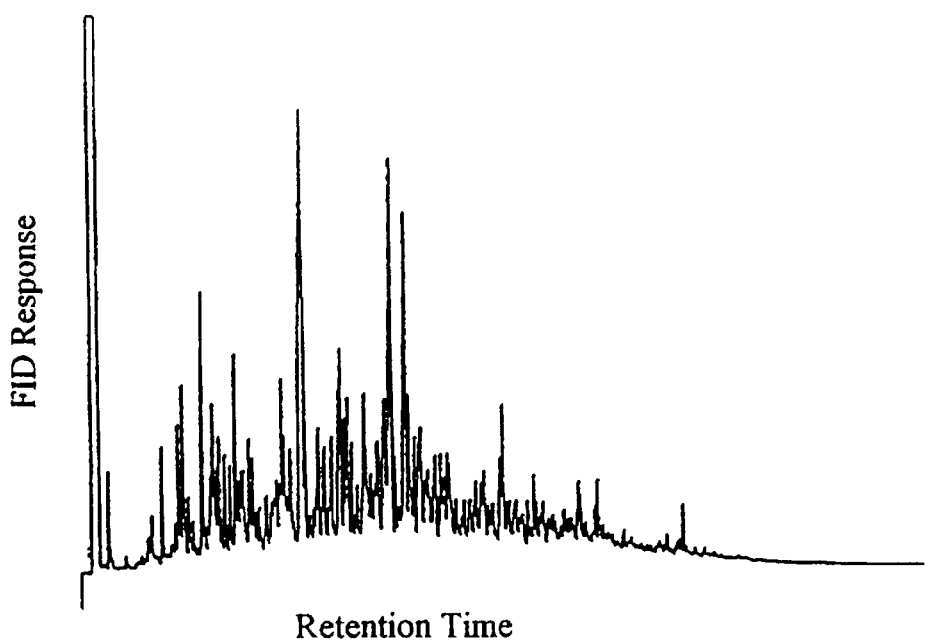

Another example of the removal of extracted organics from extractant water using activated carbon is the removal of PAHs (coal tar) from a highly contaminated (several hundred ppm of individual PAHS) soil. The water extraction at 250° C. removes all (>99.9%) detectable PAHs from the soil. The extractant water can be cleaned simultaneously by passing the water through an activated carbon cartridge which is also held at 250° C. No PAHs will be detected in the effluent water, indicating at least 99.9% clean up of the effluent water as demonstrated in FIGS. 11A and 11B. FIGS. 11A and 11B are gas chromatography/flame ionization detection (FID) analyses of coal tar PAHs extracted from highly contaminated soil. The chromatography in FIG. 11A shows the PAHs found in the extractant water when no activated carbon is used. The chromatogram in FIG. 11B shows the absence of any detectable PAHs when a duplicate sample is extracted with an activated carbon sorbent placed so that the extractant water passes through the carbon after the PAHs are extracted from the soil. The peaks shown in the bottom chromatogram are internal standards added to the extractant to allow a quantitative analysis. Identities of the PAHs can be confirmed using gas chromatography/mass spectrometry analysis. Note that the source of PAHs can be of any nature including, but not limited to coal tar, wood treatment processes, creosote, petroleum, and town gas production.

Figure 12B:
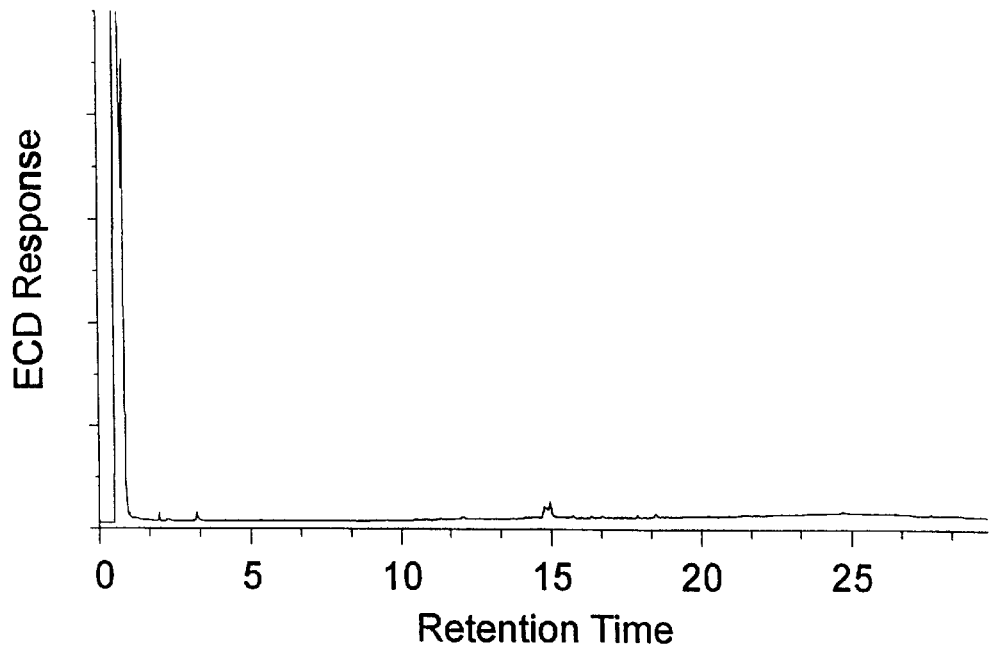
FIGS. 12A and 12B are gas chromatography/electron capture detection analyses of PCBs extracted from highly contaminated soil before (FIG. 12A) and after (FIG. 12B) treatment of the extractant water with hot activated carbon.
Figure 12A:
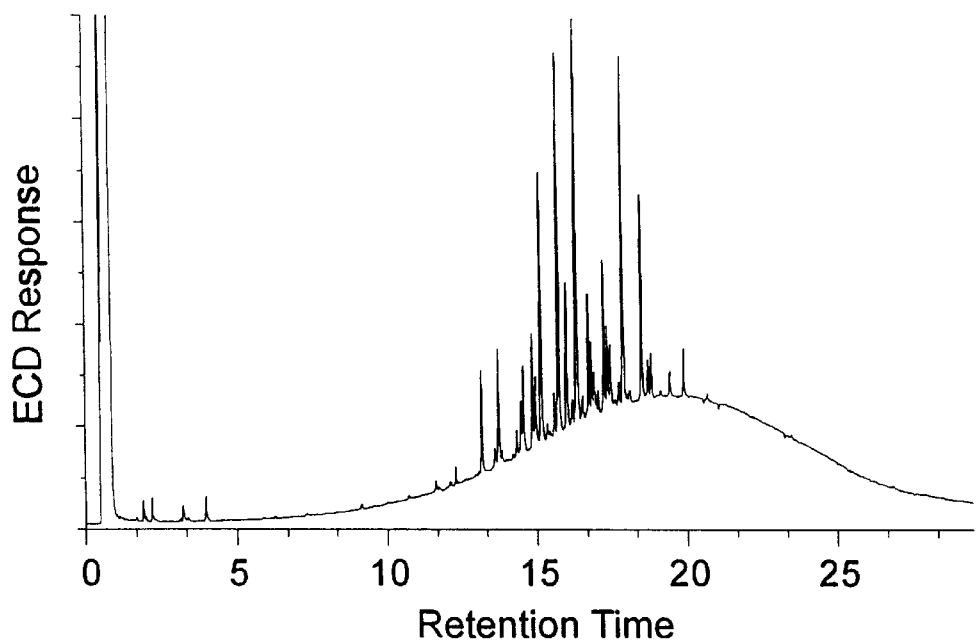

Another example of the removal of extracted organics from extractant water using activated carbon is the removal of PCBs (polychlorinated biphenyls) from a contaminated (ca. 500 mg/kg of total PCBS) soil. The water extraction at 250° C. removes all (greater than 99%) detectable PCBs from the soil. The extractant water can be cleaned simultaneously by passing the water through an activated carbon cartridge (also at 250° C.). No PCBs will be detected in the effluent water, indicating that at least 99.9% of the effluent water is cleaned as demonstrated in FIGS. 12A and 12B. FIGS. 12A and 12B are gas chromatography/electron capture detection analyses of PCBs extracted from highly contaminated soil. The chromatogram and FIG. 12A shows the PCBs found in the extractant water when no activated carbon is used. The chromatogram in FIG. 12B shows the absence of any detectable PCBs when a duplicate sample is extracted with an activated carbon sorbent placed so that the extractant water passes through the carbon after extracting the PCBs from soil. Identities of the PCBs can be confirmed using gas chromatography/mass spectrometry analysis.

A specific example of the enhanced reactions of organics using subcritical water is the destruction of pesticides from contaminated soil. In this example, the manipulation of the disassociation constant of water is used to achieve enhanced reactions. While this example could be accomplished using a pump to maintain sufficient pressure (see FIGS. 1 and 2), a more effective result is obtained using steam/water equilibrium as illustrated in FIG. 3 (described above) to maintain sufficient pressure. In this way, the contaminated soil could be placed in the reactor with water, sealed with sufficient headspace, heated, and then cooled. FIG. 13 is a table showing the degradation of pesticides in contaminated soil using subcritical water. FIG. 13 shows initial concentrations of various pesticides and the percentage of the pesticide degraded after 30 minutes at two different temperatures.

Figure 14:
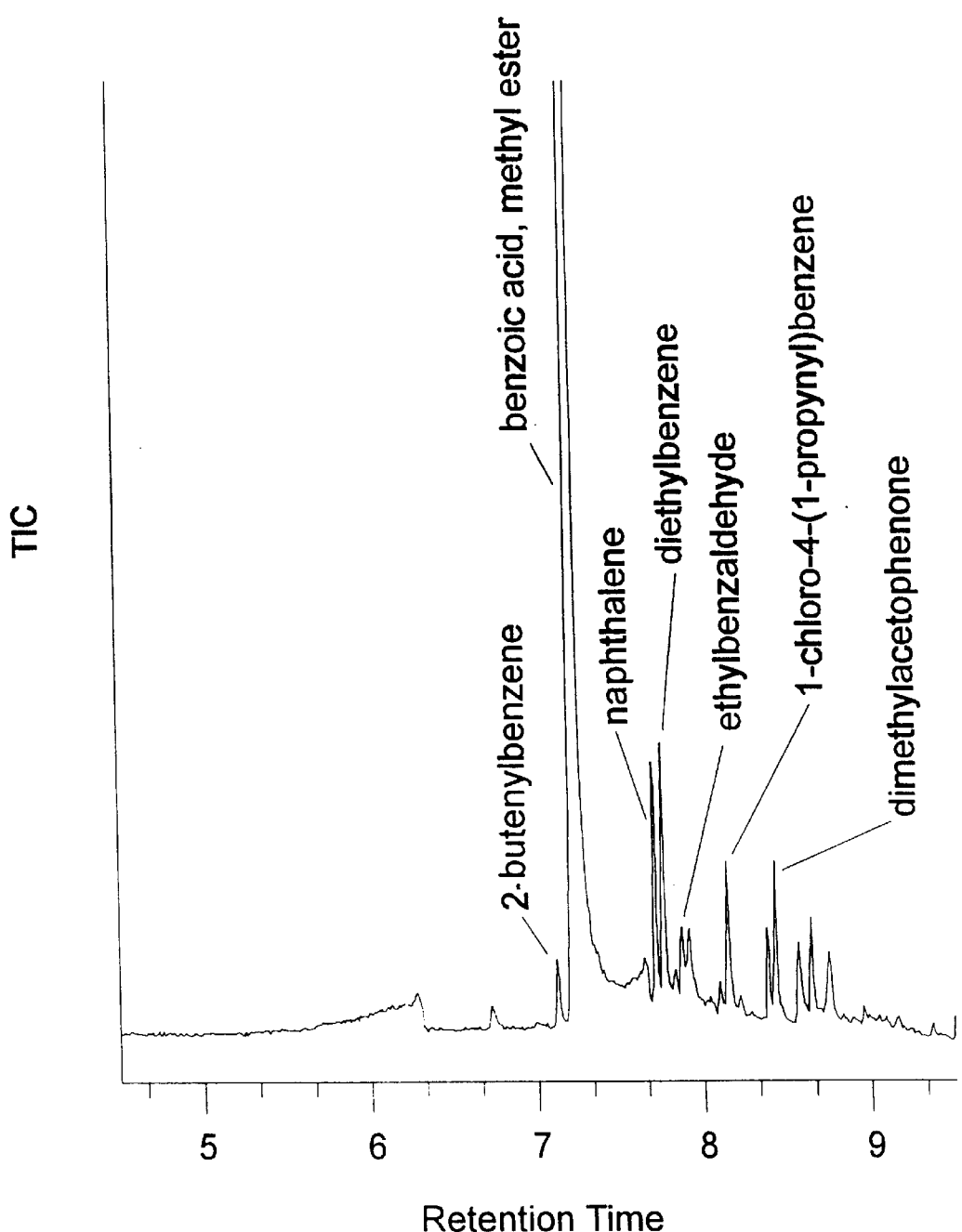
FIG. 14 shows a gas chromatography/mass spectrometry analysis of synthesis contaminants extracted from a polymer with subcritical water.

In a fifth example, the extraction of synthesis contaminants from polymers or plastics is achieved. The use of subcritical water at 200° C. to remove contaminants from a styrene divinylbenzene copolymer is demonstrated in FIG. 14. FIG. 14 shows a gas chromatography/mass spectrometry analysis of synthesis contaminants extracted with subcritical water from a styrene divinylbenzene copolymer. The process does not change the physical state of the polymer. In addition, much lower temperatures can be used (e.g., 100° to 150° C.) to extract lower molecular weight (e.g., benzene) and more polar (e.g., phenol) contaminants.

Figure 15B:
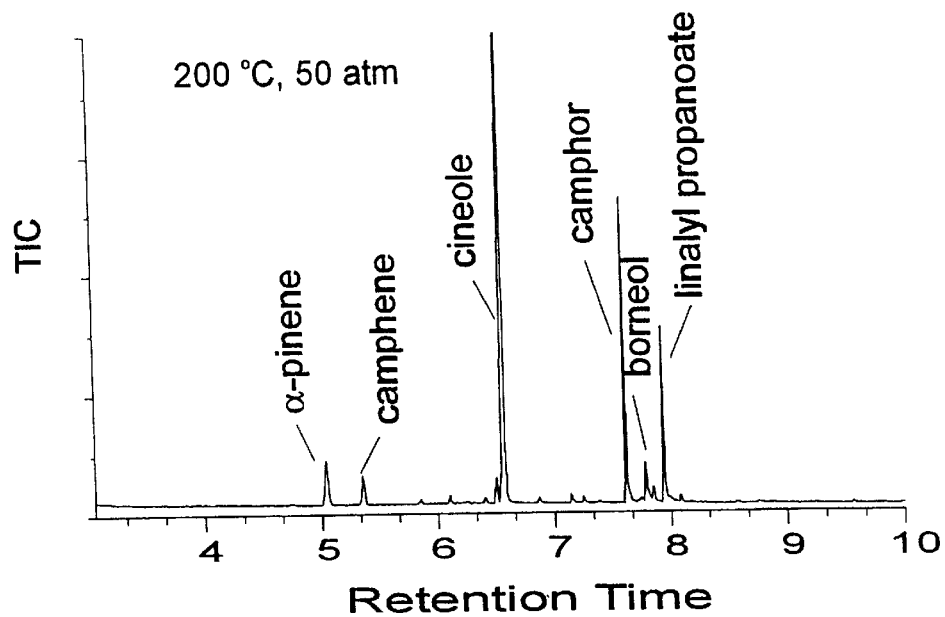
FIGS. 15A and 15B show gas chromatography/mass spectrometry analyses of biologically active organic compounds extracted with subcritical water from rosemary.
Figure 15A:
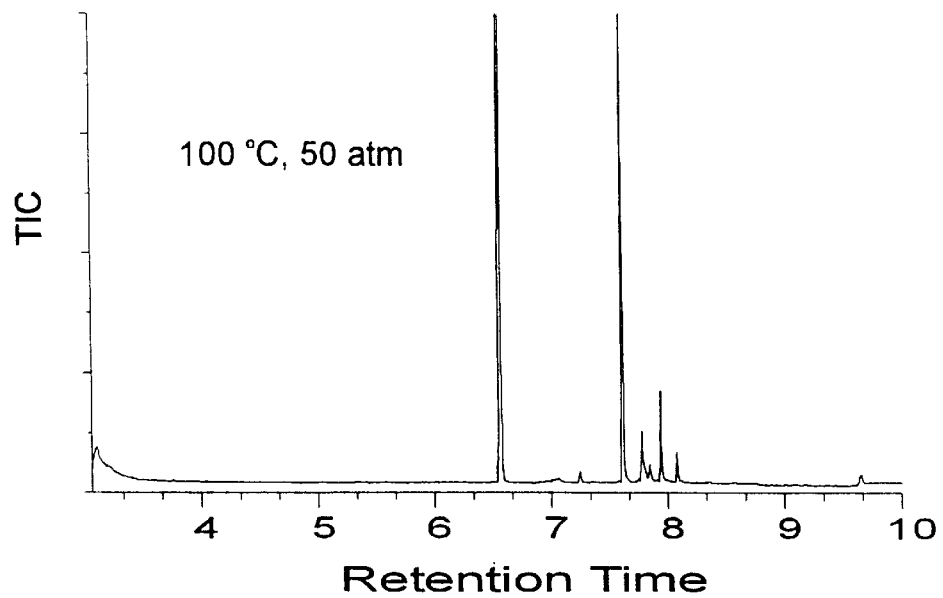

In a sixth example, the extraction of biologically active organic compounds from plant tissue is achieved. The use of subcritical water at 100° C. and 200° C. to selectively extract flavor and fragrance compounds from rosemary is demonstrated in FIGS. 15A and 15B. FIGS. 15A and 15B show gas chromatography/mass spectrometry analyses of biologically active organic compounds extracted with subcritical water from rosemary. The chromatogram in FIG. 15A shows the organics extracted at 100° C. and the chromatogram in FIG. 15B shows the organics extracted at 200° C. Note that nonpolar monoterpenes are only found in the 200° C. extract. Other polar organics such as borneol, cineole, camphor, and linalyl propanoape) extract at 100° C. while the less polar organics such as alphapinene and camphene (both mono-terpenes) extract at 200° C., thus demonstrating the ability to selectively extract different compound classes of the biologically active organics. Such separations are potentially valuable for the food, pharmaceutical and perfume industries.

In a seventh example, the use of water as a mobile phase for high pressure liquid chromatographic separations is achieved. This allows reverse-phase separations without the addition of an organic mobile phase. This also allows the use of a conventional gas chromatographic flame ionization detector (FID) with water flows up to 200 $\mu$L/minute with conventional packed liquid chromatographic (LC) columns. Note that this is the first known demonstration of a truly universal and sensitive chromatographic/detection system for reverse-phase HPLC.

Figure 16B:
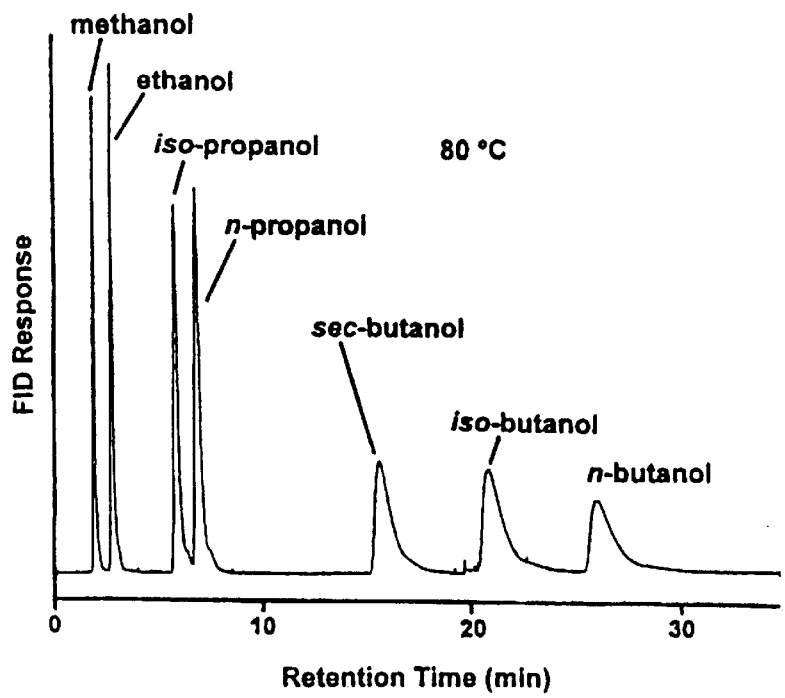
FIGS. 16A, 16B, 16C and 16D illustrate reverse-phase separations of alcohols using pure water as the mobile phase.
Figure 16A:
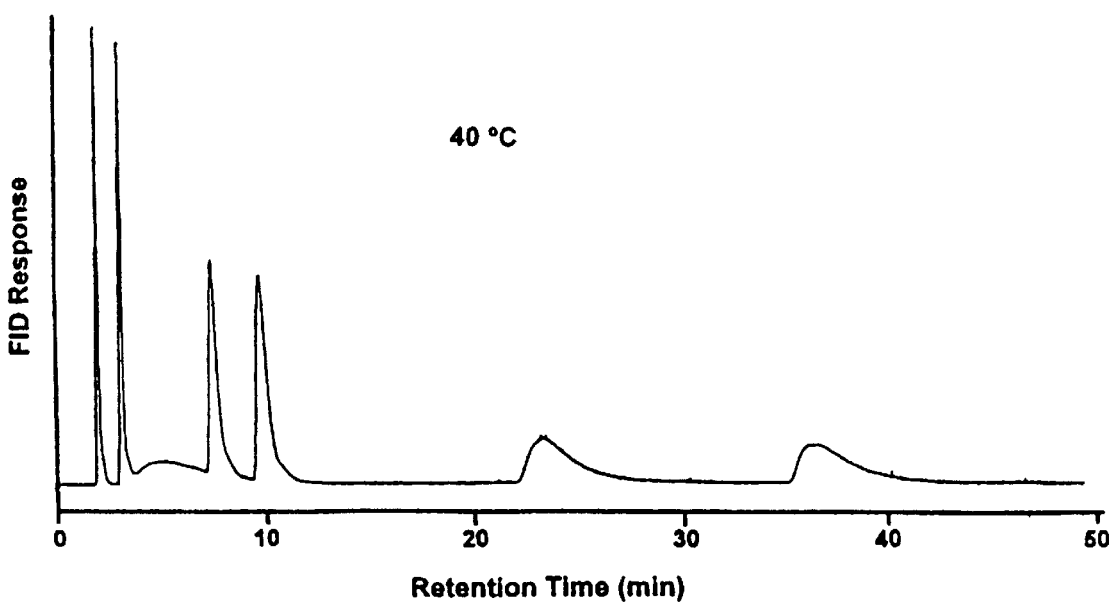
Figure 16D:
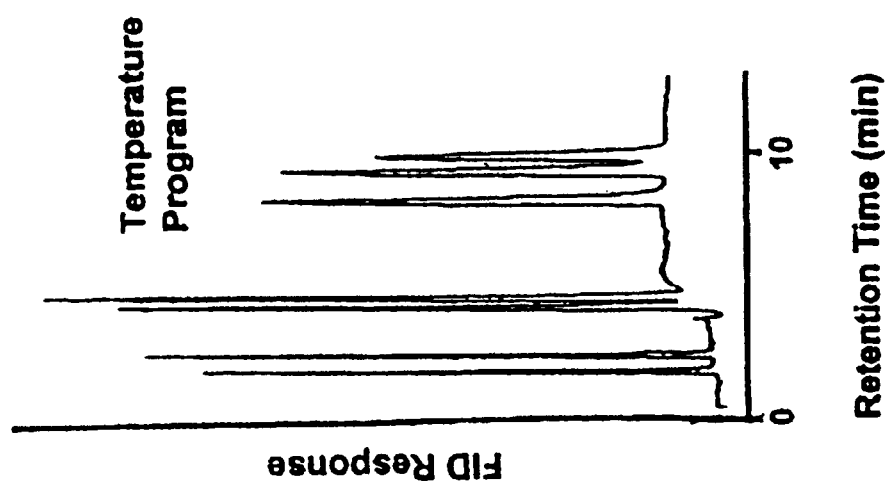
Figure 16C:
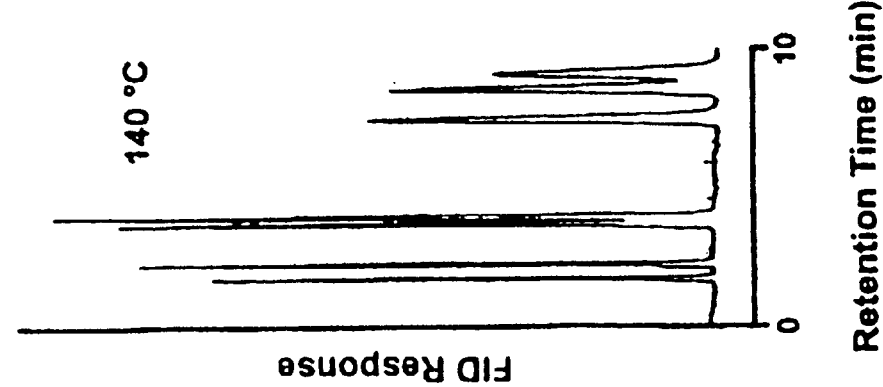
Figure 18:
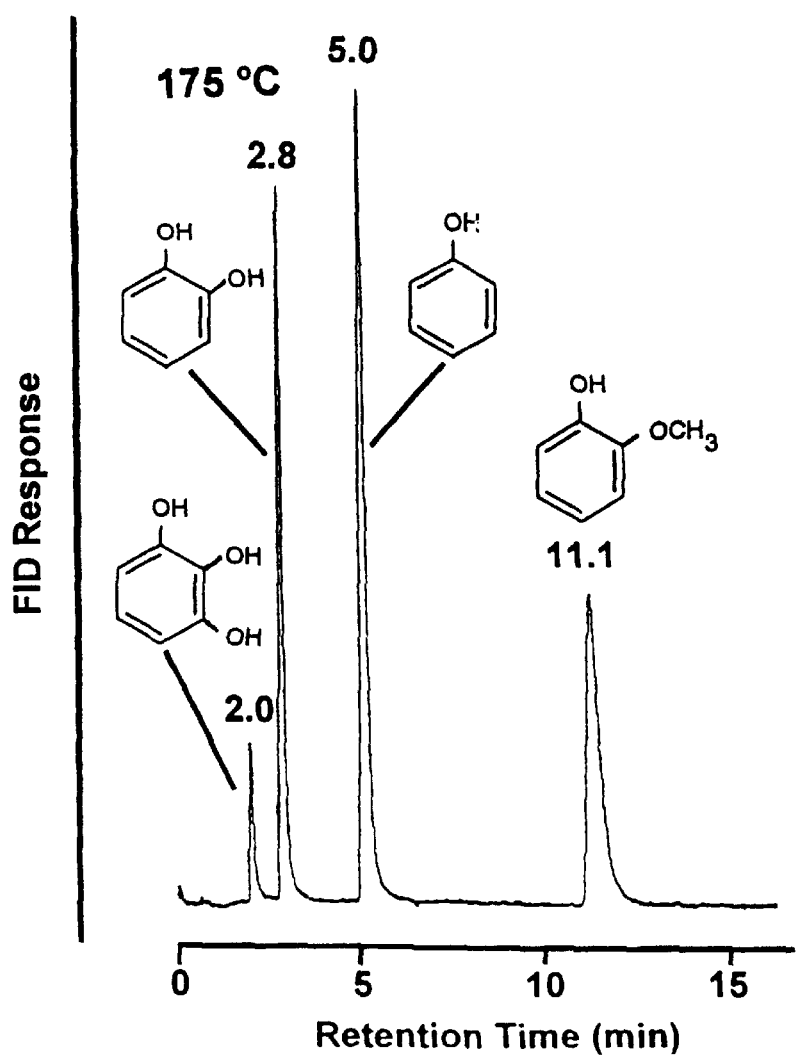
FIGS. 18 and 19A, 19B, 19C are charts illustrating FID detector responses to various phenols and amino acids separated using subcritical water and a sorbent.
Figure 19A:
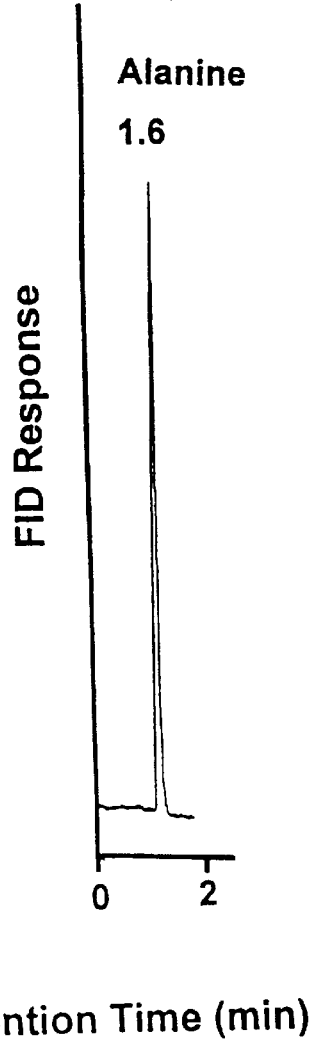
Figure 19B:
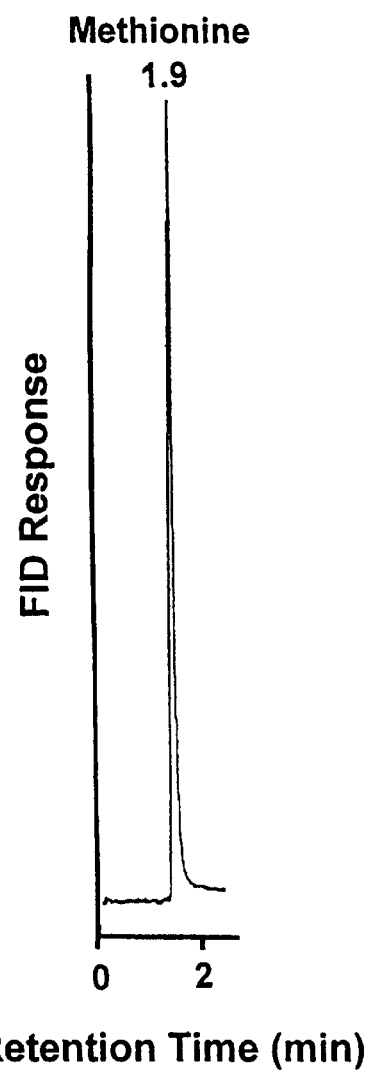
Figure 19C:
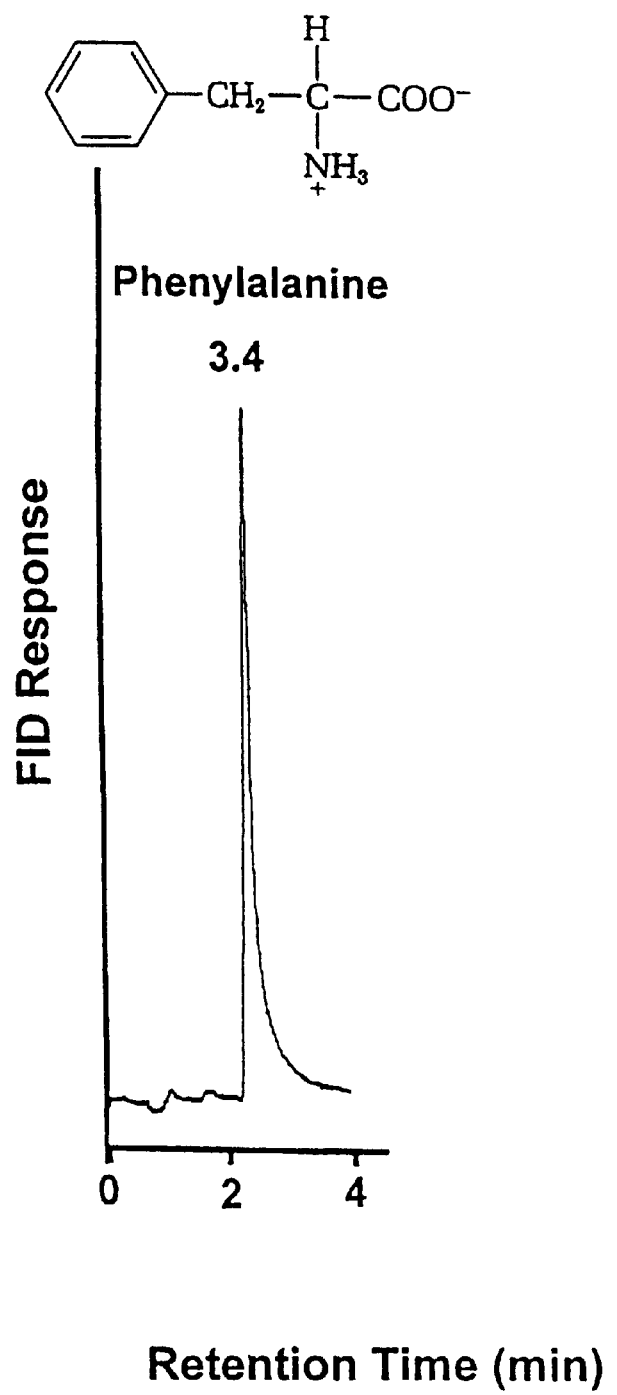

The ability to use increasing water temperature to enhance chromatographic separations which normally require the addition of organic solvents (which make the use of the FID detector impossible) as shown in FIGS. 16A, 16B, 16C and 16D for the separation of alcohols. FIGS. 16A, 16B, 16C and 16D illustrate reverse-phase separation of alcohols using pure water as the mobile phase and FID. The water temperature used is shown on the individual chromatograms of FIG. 16. The temperature program (FIG. 16D) was 120° C. (held for three minutes) followed by a temperature ramp of 15° C. per minute to 150° C. and held for ten minutes. Note that the larger alcohols (e.g., n-butanol) could not be eluted at 40° C. (FIG. 16A), while all alcohols were eluted rapidly with high resolution at 140° C. (FIG. 16C) or by performing temperature programming, as shown in FIG. 16D.

Note that the use of temperature programming to enhance HPLC elution and resolution is based on the change in water polarity achieved by increasing the temperature while maintaining the liquid state. Thus, temperature can be used in the same manner as the conventional HPLC technique of adding organic solvents. For example, increasing the water temperature to ca. 250° C. causes the same change in solvent polarity (based on the dielectric constant) as mixing methanol with the water to a methanol concentration of 100%. Thus, it is expected that temperature programming with pure water will achieve the same separations as presently performed by programmed mixing of methanol with water up to 100% methanol, as demonstrated in FIGS. 16A, 16B, 16C and 16D (described above). Similarly, heating water to ca. 200° C. causes the same change in solvent polarity as mixing acetonitrile up to concentrations of 100%.

The use of FID allows universal detection of organic solutes at ng detection limits and several orders of magnitude linearity (both features that are presently not available in detectors for reverse-phase EPLC). Also, direct quantitation of solutes and water based samples has been demonstrated by the quantitation of ethanol in alcoholic beverages, as shown in the table of FIG. 17. FIG. 17 is a table showing the determination of ethanol concentration in alcoholic beverages by reverse-phase HPLC with water as a mobile phase and flame ionization detection.

Preparative separations, etc. can also be achieved using the present invention. FIGS. 18 and 19A, 19B and 19C are charts illustrating detector responses to various phenols (FIG. 18) and amino acids (FIGS. 19A, 19B and 19C) versus retention time. As shown, it is possible, by controlling the surface tension and polarity of water, to process large scale separations using water and sorbents in order to separate desired compounds from undesired compounds.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of selectively separating different organics for isolation of desired organic species comprising:

providing subcritical water by heating water to temperatures between 100° C. and 374° C. while maintaining sufficient pressure to the water to maintain the water in a liquid state;

exposing the different organics to the water and to reverse-phase chromatographic sorbents which are also exposed to the water, said exposures taking place before or after the heating step; and removing desired organic species from the sorbents while the water is in the recited temperature range.

2. The method of claim 1 wherein the different organics are exposed to the water or the sorbent before the water is heated.

3. The method of claim 1 wherein the different organics are exposed to the sorbent or the water after the water is heated.

4. The method of claim 1 wherein the different organics are comprised of alcohols.

5. The method of claim 1 wherein the different organics include phenols.

6. The method of claim 1 wherein the different organics are comprised of biologically-active and ionic compounds.

7. The method of claim 6 wherein the biologically-active and ionic compounds include amino acids.

8. The method of claim 1 further comprising the step of detecting organic compounds with a flame ionization detector using water as the mobile phase for reverse phase high-pressure liquid chromatographic separations.

9. A method of removing organic or metal contaminants from water comprising, in any order, the steps of:
   heating the water to a temperature between 100° C. to 374° C. while maintaining sufficient pressure to the water to maintain the water in a liquid state; and
   exposing the water to carbon based sorbents at the elevated temperature in order to increase the total capacity of the sorbent and the ability of the sorbent to retain the organics in order to clean the water.

10. The method of claim 9 wherein the sorbent is comprised of an activated carbon.

11. The method of claim 9 wherein the organics include pesticides.

12. The method of claim 9 wherein the organics include polycyclic aromatic hydrocarbons.

13. The method of claim 9 wherein the organics include polychlorinated biphenyls.

14. A method of selectively extracting desired organic species from non-aqueous liquids containing organics comprising:
   heating water at a temperature between 100° C. to 374° C. while maintaining sufficient pressure to the water to maintain the water in a liquid state;
   exposing the non-aqueous liquid to the water before or after the heating step; and
   removing the desired organic species from the non-aqueous liquid while the water is in the recited temperature range, where the non-aqueous liquid is comprised of lemon oil and the desired extracted organic species is comprised of oxygenated organics extracted in preference to monoterpenes.

15. A method of selectively extracting desired organic species from non-aqueous liquids containing organics, comprising:
   heating water at a temperature between 100° C. to 374° C. while maintaining sufficient pressure to the water to maintain the water in a liquid state;
   exposing the non-aqueous liquid to the water before or after the heating step; and
   removing the desired organic species from the non-aqueous liquid while the water is in the recited temperature range, where the non-aqueous liquid is comprised of gasoline and the extracted organic species is comprised of benzene and other aromatic hydrocarbons in preference to bulk aliphatic hydrocarbons.

16. A method of selectively extracting desired organic species from non-aqueous liquids containing organics, comprising:
   heating water at a temperature between 100° C. to 374° C. while maintaining sufficient pressure to the water to maintain the water in a liquid state;
   exposing the non-aqueous liquid to the water before or after the heating step; and
   removing the desired organic species from the non-aqueous liquid while the water is in the recited temperature range, where the non-aqueous liquid is comprised of diesel fuel and the desired extracted organic species is comprised of polycyclic aromatic hydrocarbons.

17. A method of enhancing chemical reactions in water of selected organics, comprising:
   exposing the selected organics to water heated to temperatures between 100° C. and 374° C. while maintaining sufficient pressure to the water to maintain the water in a liquid state, where the selected organics include pesticides, and wherein the pesticides are degraded in the water while the water is in the recited temperature range.

18. A method of selectively removing desired organic or metal species from solid or semi-solid material containing organic or metal species, comprising:
   heating water at a temperature between 100° C. to 374° C. while maintaining sufficient pressure to the water to maintain the water in a liquid state;
   exposing the solid or semi-solid material to the water before or after the heating step; and
   removing the desired organic or metal species from the solid or semi-solid material while the water is in the recited temperature range;
   the desired organic or metal species being a contaminant which causes the material to be hazardous, the hazardous material being converted to non-hazardous waste material by removing the contaminant;
   the contaminant including pesticides.

19. A method of selectively removing desired organic or metal species from solid or semi-solid material containing organic or metal species, comprising:
   heating water at a temperature between 100° C. to 374° C. while maintaining sufficient pressure to the water to maintain the water in a liquid state;
   exposing the solid or semi-solid material to the water before or after the heating step; and
   removing the desired organic or metal species from the solid or semi-solid material while the water is in the recited temperature range;
   the desired organic or metal species being a contaminant which causes the material to be hazardous, the hazardous material being converted to non-hazardous waste material by removing the contaminant;
   the contaminant including mercury.

20. A method of selectively removing desired organic or metal species from solid or semi-solid material containing organic or metal species, comprising:
   heating water at a temperature between 100° C. to 374° C. while maintaining sufficient pressure to the water to maintain the water in a liquid state;
   exposing the solid or semi-solid material to the water before or after the heating step; and
   removing the desired organic or metal species from a solid or semi-solid material while the water is in the recited temperature range;
   the solid or semi-solid material being comprised of a polymer;
   the polymer including styrene/divinylbenzene.

21. A method of selectively removing desired organic or metal species from solid or semi-solid material containing organic or metal species, comprising:
   heating water at a temperature between 100° C. to 374° C. while maintaining sufficient pressure to the water to maintain the water in a liquid state;
   exposing the solid or semi-solid material to the water before or after the heating step; and
   removing the desired organic or metal species from a solid or semi-solid material while the water is in the recited temperature range;
   the solid or semi-solid materials comprising plant tissue.

22. The method of claim 21 wherein the desired species includes flavor or fragrance compounds.

23. The method of claim 21 wherein the desired species includes biologically active compounds.

* * * * *